United States Patent
Lee et al.

(10) Patent No.: US 6,754,818 B1
(45) Date of Patent: Jun. 22, 2004

(54) METHOD AND SYSTEM FOR BOOTSTRAPPING FROM A DIFFERENT BOOT IMAGE WHEN COMPUTER SYSTEM IS TURNED ON OR RESET

(75) Inventors: Whay Sing Lee, Newark, CA (US); Nisha Talagala, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 628 days.

(21) Appl. No.: 09/652,971

(22) Filed: Aug. 31, 2000

(51) Int. Cl.$^7$ .......................... G06F 15/177; H02H 3/05
(52) U.S. Cl. ...................... 713/2; 713/1; 714/1
(58) Field of Search .............................. 713/1, 2; 714/1

(56) References Cited

U.S. PATENT DOCUMENTS

| | | | | |
|---|---|---|---|---|
| 5,274,816 A | * | 12/1993 | Oka ............................. | 713/2 |
| 5,361,358 A | * | 11/1994 | Cox et al. .................... | 717/174 |
| 5,822,582 A | * | 10/1998 | Doragh et al. ............... | 713/2 |
| 6,061,788 A | * | 5/2000 | Reynaud et al. ............. | 713/2 |
| 6,105,130 A | * | 8/2000 | Wu et al. ..................... | 713/2 |
| 6,115,815 A | * | 9/2000 | Doragh et al. ............... | 713/2 |
| 6,128,734 A | * | 10/2000 | Gross et al. ................. | 713/100 |
| 6,230,285 B1 | * | 5/2001 | Sadowsky et al. ........... | 714/14 |
| 6,272,626 B1 | * | 8/2001 | Cobbett ........................ | 713/2 |
| 6,282,641 B1 | * | 8/2001 | Christensen ................. | 713/2 |
| 6,446,203 B1 | * | 9/2002 | Aguilar et al. .............. | 713/2 |
| 6,473,857 B1 | * | 10/2002 | Panas et al. ................. | 713/2 |
| 6,532,535 B1 | * | 3/2003 | Maffezzoni et al. ......... | 713/1 |

FOREIGN PATENT DOCUMENTS

GB      2346715 A    *   8/2000
JP      403042751 A    *   2/1991

OTHER PUBLICATIONS

"User Selectable Boot Process" IBM TDB, Jan. 1995, vol. 38 pp 377–378.*
"Boot Path Selection Verification and Override" Research Disclosure, Jun. 1999, UK, vol. 42 Issue No. 422.*

* cited by examiner

Primary Examiner—Thomas Lee
Assistant Examiner—Chun Cao
(74) Attorney, Agent, or Firm—Blakely, Sokoloff, Taylor & Zafman LLP

(57) ABSTRACT

A system and related method are described for booting from one of multiple boot images that includes a processor coupled to a main memory, a number of boot devices and a selector. The boot devices are used to store multiple copies of a boot image and are in communication with the processor through a controller. The selector is used to select a different boot device each time the system is turned on or reset. A set of instructions executed by the processor loads the boot image from one of the boot devices selected by the selector into the main memory. In one embodiment, the selector is embodied in the form of software instructions incorporated into or linked to a system BIOS program. In another embodiment, the selector is embodied in the form of software instructions incorporated into or linked to a SCSI BIOS program. In yet another embodiment, the selector is embodied in the form of a selector switch coupled between a controller and the boot devices, wherein when a power switch of the system is actuated, the selector switch connects a different boot device to a port designated as a boot device port.

29 Claims, 5 Drawing Sheets

METHOD AND SYSTEM FOR BOOTSTRAPPING FROM A DIFFERENT BOOT IMAGE WHEN COMPUTER SYSTEM IS TURNED ON OR RESET

BACKGROUND OF THE INVENTION

1. Field of the Invention

The present invention generally relates to computer systems, and in particular, to a method and a corresponding system for bootstrapping from multiple boot images.

2. Description of the Related Art

The term "bootstrapping" is used to describe a process in which a computer system, when it is first powered up or initialized, fetches initial program instructions (e.g., basic input/output system (BIOS)) from a predetermined location. The BIOS is a set of software routines stored in a non-volatile storage device such as a flash memory or a read only memory (ROM) that tests hardware at startup, starts the operating system and supports the transfer of data among hardware devices. The BIOS can be configured by a user to statically point to a specified location on a mass storage device (e.g., the "boot sector" of a particular disk drive) to fetch a "boot image." The boot image contains a first portion of bootstrapping instructions that are performed right after control is transferred from the BIOS. In other words, during power up or reset of a computer system, the BIOS is first loaded and the control is passed to the boot image which in turn performs certain operations to load and initialize an operating system.

It is desirable to incorporate multiple copies of the boot image into a computer system so that an operating system can be loaded and initialized even if one of the boot images is corrupted. This is accomplished in many conventional systems by maintaining two or more "mirrored copies" of the boot image on independent disk drives. In such systems, the BIOS is programmed to compare or check sum the boot image copies upon power up and transfer control only to one boot image that is agreed by a majority to be a good (uncorrupted) boot image. Such systems can be very complex if many copies of the boot image are to be maintained. On the other hand, if only a small number of boot images, such as two copies are used (or if more than a majority of the images have been corrupted), the system may make a wrong guess and choose to boot from a corrupted copy, in which case the system may hang half-way through the bootstrapping process when it encounters corrupted code. In these cases, the bootstrapping process generally cannot be completed even if the system is equipped with a watch-dog timer (also commonly called a "dead man's switch") which forces the machine to reboot itself after a preset period of inactivity/non-response since the system may repeatedly attempt to reboot from the same corrupted image.

SUMMARY OF THE INVENTION

According to one aspect of the invention, a system for booting from one of multiple boot images is provided that includes a processor coupled to a main memory, a number of boot devices and a selector. The boot devices are used to store multiple copies of a boot image and are in communication with the processor through a controller. The selector is used to select a different boot device each time the system is turned on or reset. A set of instructions executed by the processor loads the boot image from one of the boot devices selected by the selector into the main memory.

In one embodiment, the selector is embodied in the form of software instructions incorporated into or linked to a system BIOS program. In another embodiment, the selector is embodied in the form of software instructions incorporated into or linked to a SCSI BIOS program. In yet another embodiment, the selector is embodied in the form of a selector switch coupled between a controller and the boot devices, wherein when a power switch of the system is actuated, the selector switch connects a different boot device to a port designated as a boot device port.

DETAILED DESCRIPTION OF THE INVENTION

Implementations of the present invention are described herein for purposes of illustration, namely a method and a corresponding system for bootstrapping from multiple boot images. According to one aspect of the invention, the system is capable of completing its bootstrapping process reliably as long as at least one good (i.e., uncorrupted) boot image remains intact. It should be noted that the terms "computer system" and "computer" in the context of the present invention are used to describe a system, a machine or any other device that requires bootstrapping to load and initialize the operating system.

In general, when a computer fails to initialize when it is powered up, the first reaction most users have is to turn off the power, and then turn it back on again, hoping that it will work the second time around. In most cases, if the machine remains non-operational, the user also tends to repeat the power-off-on cycle a few more times, just to be sure.

The present invention exploits this very common human behavior by configuring a computer system to contain a number of boot images and include a mechanism for booting from a different boot image each time the power is turned on or the computer is reset. In this regard, if the computer system should hang on a corrupted image, it will simply select another boot image on its subsequent bootstrapping process. One method of selecting a different boot image is to simply rotate sequentially among the available boot images in a "round robin" fashion. Alternatively, a boot image may be selected randomly among the set of boot devices each time the computer system is powered on or initialized. In the round robin scheme, so long as there is at least one good boot image available, the system will boot up successfully after several attempts. If a random selection scheme is used, the law of probabilities dictate that the system will boot up successfully, after some number of attempts, so long as there is at least one good boot image available.

In conventional computer systems (e.g., personal computers), a user may statically configure the BIOS program to boot from a particular sequence of boot devices connected to the computer. Accordingly, when the power is turned on, the conventional computer systems will search for the presence of a boot device, in the order as indicated by the user-defined sequence, and transfer control to the boot image on the first boot device it finds. However, the order of searching for a boot device is fixed, meaning that these conventional systems will always start at the beginning of the predefined sequence. Consequently, if the first boot image is corrupted, the conventional computer systems will not initialize successfully since in the subsequent rebooting process the computer will attempt to boot from the same corrupted image.

Figure 1:
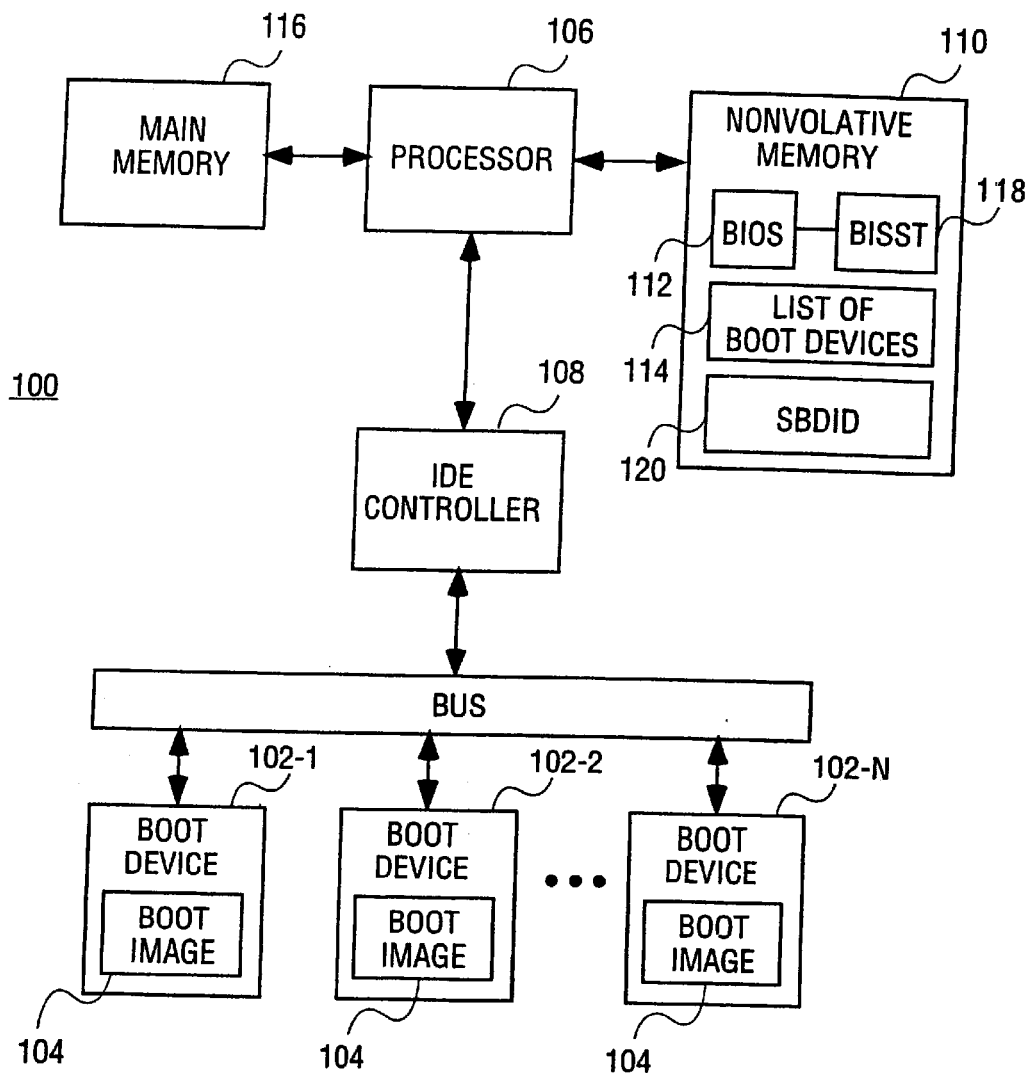
FIG. 1 is a block diagram of a computer system according to a first embodiment of the invention.

FIG. 1 depicts a simplified representation of a computer system 100 according to a first embodiment of the invention. The computer system 100 can boot from a number of boot devices 102-1 through 102-N (e.g., a floppy disk drive, a hard disk drive, a CD-ROM and the like). The boot devices 102 contain, among other things, multiple copies of a boot image 104, one or more copies of an operating system and user application programs. Although in the illustrated computer system 100, three boot devices 102 are shown, it should be understood that the number of boot devices is arbitrary and could be any number. The boot devices 102 communicate with a processor 106 by means of a disk-drive controller such as an integrated drive electronics (IDE) controller 108.

Also included in the computer system 100 is a nonvolatile memory device 110 (e.g., flash memory) containing a system firmware 112 (e.g., BIOS program 112) whose primary function is to find and load the boot image 104 from one of the boot devices 102. The BIOS program 112 has access to a list of boot devices 114 it can load the boot image from. This list of boot devices 114 is modifiable and predefined by a user interacting with the BIOS program 112. When the system 100 is turned on, the processor 106 fetches the BIOS program 112 from the nonvolatile memory device 110, which contains instructions for loading a boot image 104 into a main memory 116 from one of the boot devices 102. Once the boot image 104 has been loaded, the processor 106 performs operations to load and initialize an operation system according to a series of bootstrapping instructions contained in the boot image 104.

In the first embodiment, the present invention is embodied in the form of a set of software instructions (referred hereinafter as a boot image select software task "BISST" 118) inserted in or linked to the BIOS program 112. The BISST 118 is configured to select a different boot device among the list of boot devices 112 each time the power is turned on or the computer is reset. The BISST 118 performs a number of operations, including (1) maintaining a list of boot devices available, (2) identifying the boot device used during previous boot, (3) selecting a different boot device among the list of boot devices available, (4) updating a selected boot device identifier data ("SBDID" 120) based on an identification number associated with the boot device selected and (5) loading a boot image from the boot device selected. The list of boot devices 114 and SBDID 120 are stored in the non-volatile memory device (e.g., flash memory) and are accessed and updated by the BISST 118 during each attempt to boot the computer system 100.

Figure 2:
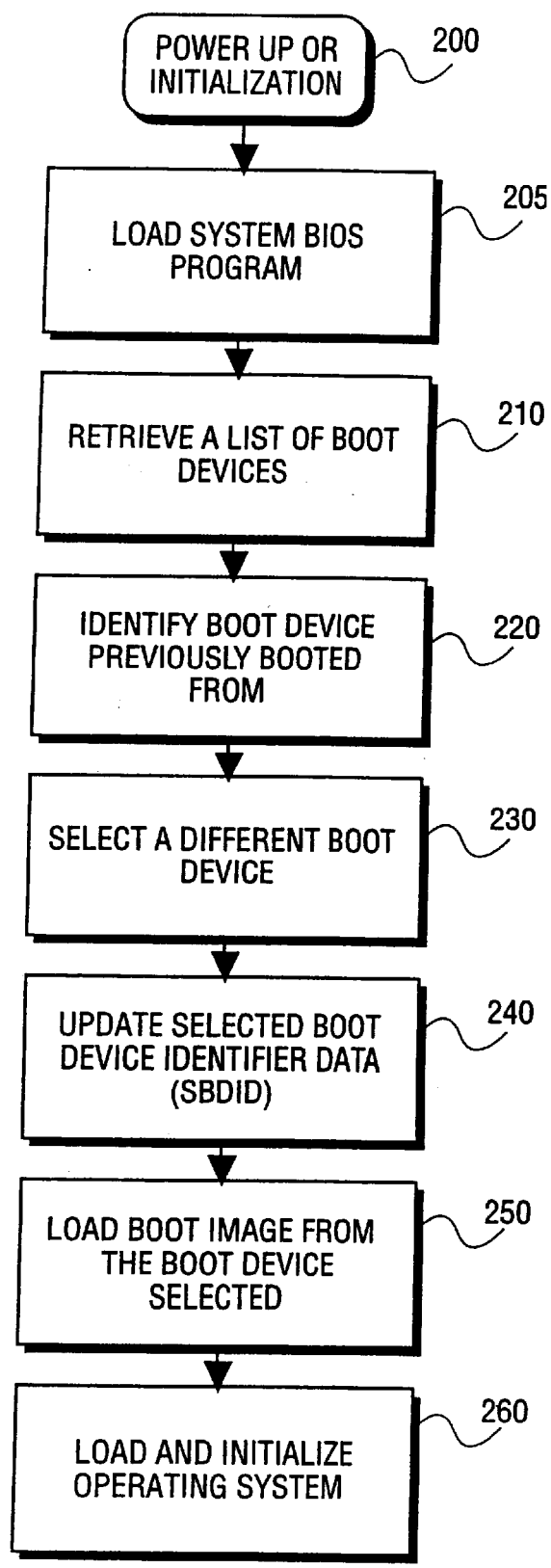
FIG. 2 is a flowchart diagram of bootstrapping operations according to the first embodiment of the invention.

FIG. 2 depicts a flowchart of bootstrapping operations according to the first embodiment of the invention. The bootstrapping operation begins in block 200 when the computer is turned on or is reset. Once the power is turned on, the processor loads the system BIOS program from the non-volatile storage device in block 205. The BISST running as part of the system BIOS program retrieves the list of boot devices available on the computer system (block 210). The BISST identifies the boot device that was used during previous attempt to boot the computer system by reading the SBDID (block 220). Based on the SBDID and the list of available boot devices, the BISST selects a different boot device to boot the computer system (block 230) and updates the SBDID based on the identification number associated with the boot device selected (block 240). As mentioned earlier, the selection of the image to boot from, can be simply rotated amongst all available boot images in a round robin fashion, or it may be a random choice amongst the available boot images. Then in block 250, the BIOS will pass control to the boot image contained in the boot device selected by the BISST, which in turn performs bootstrapping operations to load and initialize the operating system (block 260). If for some reason the system hangs during a bootstrapping process and a user reboots the computer system by turning on the power or resetting the computer, the system will load a boot image from a different boot device during each subsequent boot attempt. Accordingly, the computer system will boot successfully as long as there is at least one uncorrupted boot image available.

Figure 3:
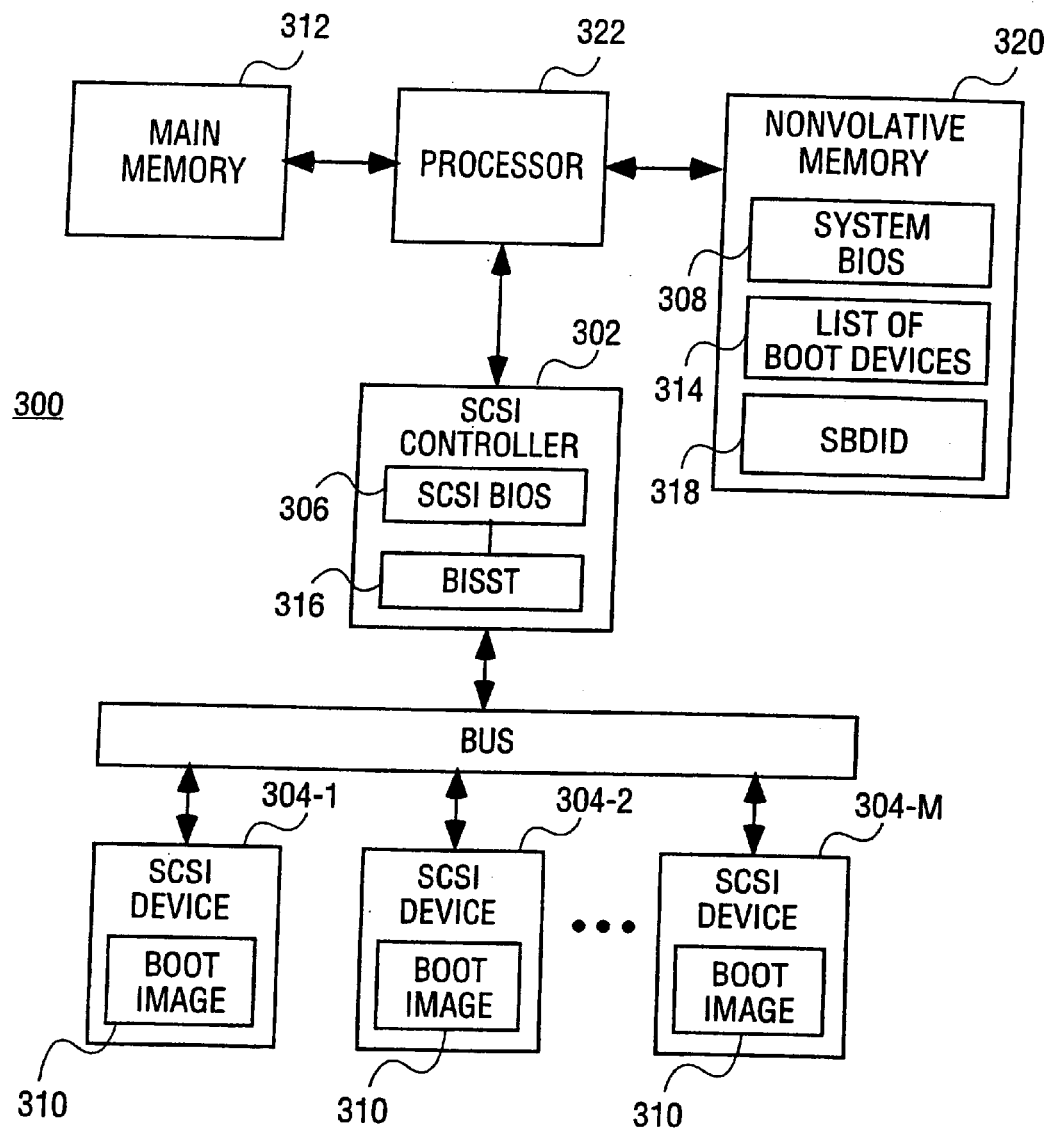
FIG. 3 is a block diagram of a computer system according to a second embodiment of the invention.

FIG. 3 depicts a simplified representation of a computer system 300 according to a second embodiment of the invention. The second embodiment is implemented in a computer system having a Small Computer System Interface (SCSI) controller 302 which provides for an attachment of SCSI compatible peripheral devices 304-1 through 304-M such as a hard drive, a floppy drive, a CD-ROM drive and the like. The computer system 300 is configured to boot from any one of the SCSI devices 304 coupled to the controller 302. If the SCSI controller 302 has its own SCSI BIOS program 306, the system BIOS program 308 will defer to the SCSI BIOS program 306 for selecting and loading a boot image 310 into a main memory 312 from one of the SCSI devices 304. The SCSI BIOS program 306 allows a user to specify and modify a list of SCSI boot devices 314 available in the computer system.

The second embodiment of the invention is also embodied in the formed of a boot image select software task (BISST) 316 inserted in or linked to the SCSI BIOS program 306 to enable the system 300 to select and load a boot image from a different boot device each time the system is power up or reset. As previously described, the BISST 316 performs a number of operations, including (1) maintaining a list of boot devices available, (2) identifying the boot device used during previous boot, (3) selecting a different boot device among the list of boot devices available, (4) updating a selected boot device identifier data ("SBDID" 318) based on an identification number associated with the boot device selected and (5) loading a boot image from the boot device selected. The list of boot devices 314 and SBDID 318 are stored in a non-volatile memory device 320 and are accessed and updated by the BISST 316 during each attempt to boot the computer system 300.

Figure 4:
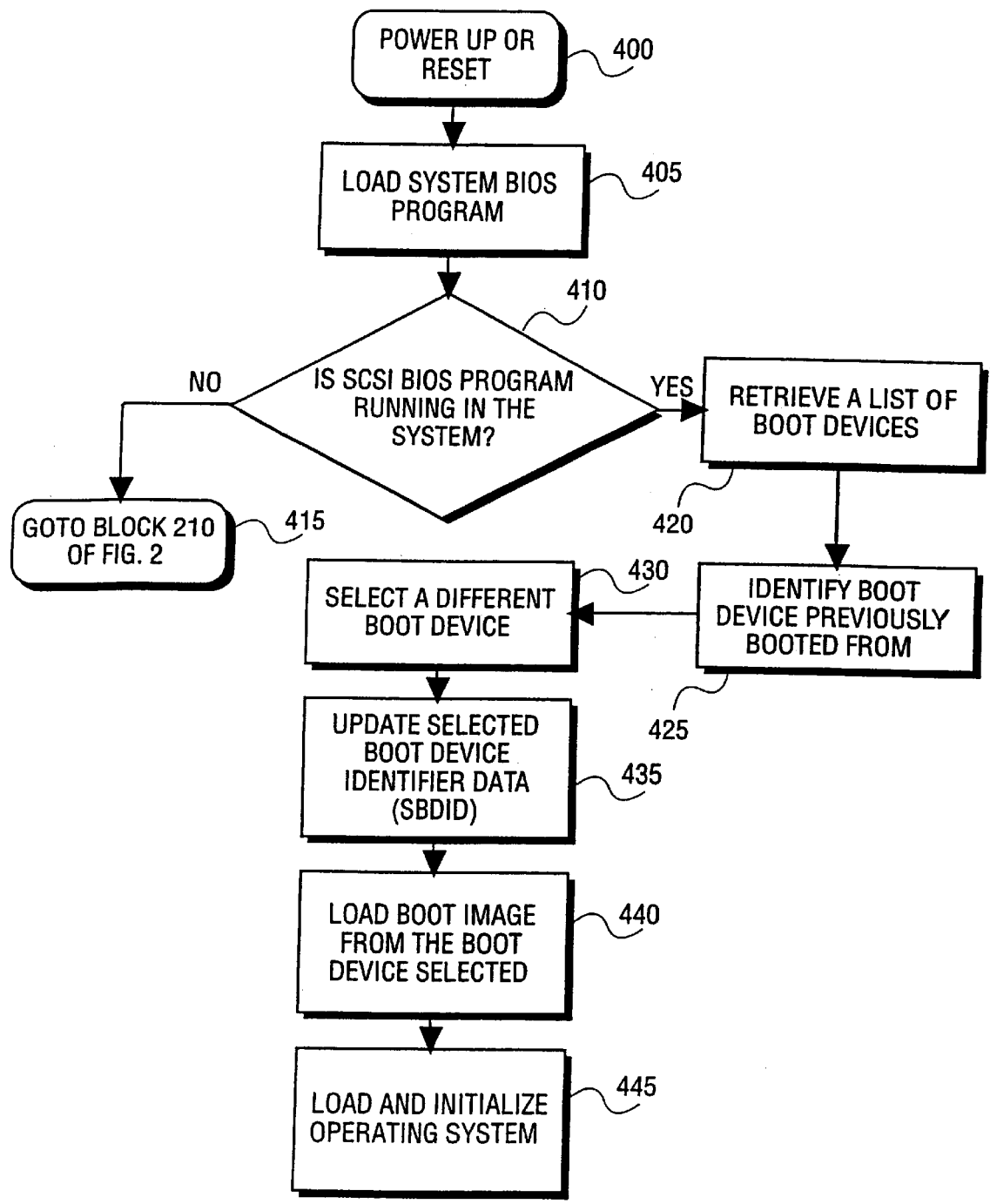
FIG. 4 is a flowchart diagram of bootstrapping operations according to the second embodiment of the invention.

FIG. 4 depicts a flowchart of bootstrapping operations according to the second embodiment of the invention. The bootstrapping operation begins in block 400 when the computer system is turned on or it is reset. Then, the computer system fetches the system BIOS program 308 from a predetermined location in a non-volatile memory (block 405). Next, the system BIOS program 308 determines if a SCSI controller having its own BIOS program is incorporated into the computer system (410). If there is no SCSI BIOS program present (block 410, no), the bootstrapping operations proceeds to block 210 of FIG. 2. Otherwise, if there a SCSI BIOS program 306 running in the system (block 410, yes), the system BIOS program 308 will defer to the SCSI BIOS program 306 by proceeding to block 420. At this point, the BISST 316 running as part of the SCSI BIOS program 306 will retrieve a list of boot devices available in the computer (block 420). The BISST 316 also identifies which boot device was used during previous attempt to boot the computer system by reading the selected boot device identifier data ("SBDID" 318) (block 425). Based on the list of boot devices 314 and SBDID 318, the BISST 316 selects a different boot device to load boot image during current attempt to boot the computer system (block 430) and updates the SBDID 318 based on an identification number associated with the boot device selected (block 435). Then in block 440, the BIOS program finds and loads the boot image from the boot device specified by the BISST. Based on a series of instructions contained in the boot image, the system-loads and initializes the operating system (block 445).

Figure 5:
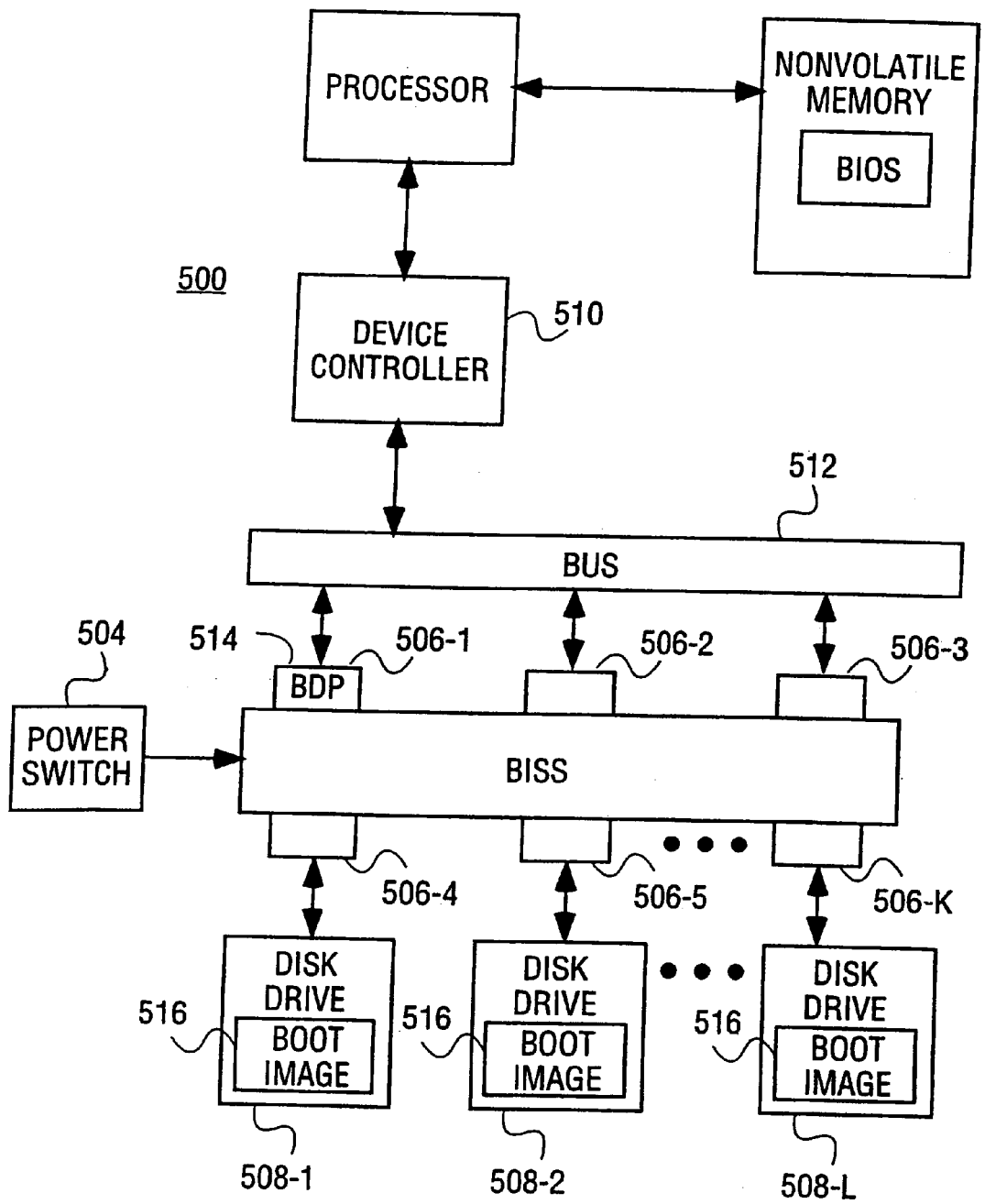
FIG. 5 is a schematic diagram of a computer system according to a third embodiment of the invention.

FIG. 5 depicts a simplified representation of a computer system 500 according to a third embodiment of the invention. In this embodiment, the computer system 500 is configured to select a different boot device in a round-robin fashion each time the power is turned. This embodiment may be implemented in a computer system that requires a user to manually turn on the system after each failed boot attempt. Incorporated in the computer system 500 is a boot image selector switch 502 (referred hereinafter as "BISS"). The BISS 502 is operatively coupled to a power switch 504 and has a number of nodes 506-1 through 506-K for interconnecting a number of boot devices 508-1 through 508-L with a device controller 510 via a bus 512. The BISS 502 may be embodied in the form of a mechanical switch, an electrical switch, software codes or firmware functions.

The BISS 502 is configured such that when the power switch 504 is actuated, in addition to toggling the on/off the power supply to the system 500, connects, either logically or physically, a different boot device to a port statically designated as the boot-device port ("BDP" 514) in the system (e.g., drive "C" port, or equivalently IDE Channel 0, Device Port 0 in a common PC computer). In other words, the BISS 502 selectively connects one of the boot devices 508 to the boot device port 514 each time the computer system is powered on. In one implementation, the identification scheme of the boot devices 508 is set up in accordance with the connection state of the BISS 502. In another implementation, after the operating system has been properly loaded and initialized and before starting any application programs, a system program may be configured to ensure (e.g., by realigning logical mappings) that the same physical storage devices 508 are known to the system 500 by the same logical designations, no matter which boot image the system is booted from.

The operation of the third embodiment of the invention is as follows. The BISS 502 is configured to select a different boot device in a round-robin fashion each time the power switch is actuated by a user. In this regard, if the user continues to do what he/she is accustomed to doing when a system boot failure is encountered (i.e., he/she pushes the power button a few more times to see if it will work), the computer system 500 will boot successfully as long as there is at least one good (uncorrupted) boot image 516 available. Similarly, the BISS 502 may also be coupled to a reset mechanism of the computer 500 such that when the user manually resets (warm boot) the computer after an unsuccessful system boot, a different boot device can be selected by the BISS 502 during a subsequent attempt to boot.

As will be understood by one of ordinary skill in the art, the rotation of the boot devices can be carried out even in situations when a user explicitly boots the computer system remotely (e.g., by controlling the power switch via some telephone-based contraption), without being physically present near the machine. In this regard, the BISS can be incorporated into a computer system that can be remotely activated so that each time the power switch is actuated remotely or locally, the BISS will select a different boot device to boot from.

In another aspect of the invention, a dead man's switch is used to force the computer system to reboot itself after a predefined time period of inactivity or non-response. In this regard, the dead man's switch together with the boot image selection feature of the invention enable the computer system to reliably boot itself, without human intervention.

In yet another aspect of the invention, once the computer system completes its initialization, the computer system is configured to perform appropriate diagnostic operations (e.g., running sanity checks to ensure that the system has been booted into a known-good state) and report/repair the corrupted images.

In one implementation, the boot device with a corrupted boot image is temporary removed from the list of boot devices until the boot image has been repaired or replaced with a properly working boot image.

In yet another aspect of the invention, the system is configured to rotate through the list of available boot devices after each system boot attempt (e.g., successful or unsuccessful system boot).

In an alternative embodiment of the invention, the system is configured to rotate through the list of available boot device only after an unsuccessful system boot.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A system comprising:
a processor;
a main memory coupled to said processor;
a plurality of boot devices, each boot device including a boot image;
a controller coupled between said processor and said plurality of boot devices;
a selector to automatically select a different boot device among said plurality of boot devices, when the system is turned on or reset; and
a set of instructions executed by said processor to load the boot image from one of the boot devices selected by the selector into the main memory, wherein the selector is embodied in the form of a selector switch coupled between the controller and said plurality of boot devices, wherein each time a power switch of the system is actuated, the selector switch connects a different boot device to a port designated as a boot device port.

2. The system of claim 1, wherein said controller is an integrated drive electronics (IDE) controller.

3. The system of claim 1, wherein said controller is a Small Computer System Interface (SCSI) controller running a SCSI BIOS program.

4. The system of claim 1, wherein the different boot device is selected by rotating sequentially among said plurality of boot devices.

5. The system of claim 1, wherein the different boot device is selected randomly among said plurality of boot devices.

6. The system of claim 1, wherein the selector selects a different boot device among said plurality of boot devices only after an unsuccessful system boot.

7. The system of claim 1, wherein the selector automatically selects, without human intervention, a different boot device among the plurality of boot devices, when the system is turned on or reset.

8. A method comprising:
installing a copy of a boot image on each one of a plurality of boot devices of a computer system;
automatically selecting one of said plurality of boot devices, different from a boot device used during an immediately preceding boot attempt, when the computer system is powered up or reset; and
loading a boot image into a system memory from said one of the boot devices selected,
wherein selecting of one of the boot devices is accomplished using a selector switch coupled between a controller and said plurality of boot devices, wherein each time a power switch of the system is actuated, the selector switch connects a different boot device to a port designated as a boot device port.

9. The method of claim 8, further comprising:
allowing a user to define a list of boot devices available on the computer system;
in response to the computer system being powered up or initialized, determining which boot device was used during an immediately preceding boot attempt; and
selecting one of the boot devices based on the list of boot devices and the boot device previously used.

10. The method of claim 9, further comprising removing one of the boot devices from said list of available boot devices if it is determined that said one of the boot devices contains a corrupted boot image.

11. A system for booting from multiple boot image sources, comprising:
a plurality of boot devices, each boot device containing a copy of a boot image;
selecting means for automatically selecting a different boot device among said plurality of boot devices, when the system is turned on or reset; and
loading means for loading the boot image from one of the boot devices selected by the selecting means into a system memory, wherein the selecting means comprises a selector switch coupled between a controller and said plurality of boot devices, wherein when a power switch of the system is actuated, the selector switch connects a different boot device to a port designated as a boot device port.

12. The system of claim 11, wherein the loading means comprises a system basic input/output system (BIOS) program.

13. The system of claim 12, wherein the selecting means comprises software instructions incorporated into or linked to the BIOS program.

14. The system of claim 13, wherein said software task is configured to (a) maintain a list of boot devices on the system, (b) identify one of said boot devices use during previous bootstrap process and (c) select a different boot device each time the system is turned on or reset.

15. The system of claim 11, wherein the selecting means comprises software instructions incorporated into or linked to the SCSI BIOS program.

16. A system comprising:
a processor;
a main memory coupled to said processor;
a plurality of boot devices, each boot device including a boot image;
a controller coupled between said processor and said plurality of boot devices;
a selector to select a different boot device among said plurality of boot devices each time the system is turned on or reset; and
a set of instructions executed by said processor to load the boot image from one of the boot devices selected by the selector into the main memory, wherein the selector is embodied in the form of a selector switch coupled between the controller and said plurality of boot devices, wherein each time a power switch of the system is actuated, the selector switch connects a different boot device to a port designated as a boot device port.

17. The system of claim 16, wherein said controller is selected from an integrated drive electronics (IDE) controller and a Small Computer System Interface (SCSI) controller running a SCSI BIOS program.

18. The system of claim 16, wherein the different boot device is selected by rotating sequentially among said plurality of boot devices.

19. The system of claim 16, wherein the different boot device is selected randomly among said plurality of boot devices.

20. The system of claim 16, wherein the selector selects a different boot device among said plurality of boot devices only after an unsuccessful system boot.

21. A system for booting from multiple boot image sources, comprising:
a plurality of boot devices, each boot device containing a copy of a boot image;
selecting means for selecting a different boot device among said plurality of boot devices each time the system is turned on or reset;
loading means for loading the boot image from one of the boot devices selected by the selecting means into a system memory, wherein the loading means comprises a system basic input/output system (BIOS) program,
wherein the selecting means comprises a selector switch coupled between a controller and said plurality of boot devices, wherein when a power switch of the system is actuated, the selector switch connects a different boot device to a port designated as a boot device port.

22. The system of claim 21, wherein said controller is selected from an integrated drive electronics (IDE) controller and a Small Computer System Interface (SCSI) controller running a SCSI BIOS program.

23. The system of claim 21, wherein the different boot device is selected by rotating sequentially among said plurality of boot devices.

24. The system of claim 21, wherein the different boot device is selected randomly among said plurality of boot devices.

25. The system of claim 21, wherein the selector selects a different boot device among said plurality of boot devices only after an unsuccessful system boot.

26. A method comprising:
installing a copy of a boot image on each one of a plurality of boot devices of a computer system;
selecting a different boot device among the plurality of boot devices, when the system is turned on or reset; and
loading a boot image into a system memory from said one of the boot devices selected,
wherein selecting of one of the boot devices is accomplished using a selector switch coupled between a controller and said plurality of boot devices, wherein when the system is turned on or reset, the selector switch connects a different boot device to a port designated as a boot device port.

27. The method of claim 26, wherein selecting a different boot device comprises selecting one of the boot devices different from a boot device used during an immediately preceding boot attempt.

28. The method of claim 26, further comprising:

allowing a user to define a list of boot devices available on the computer system;

in response to the computer system being powered up or initialized, determining which boot device was used during an immediately preceding boot attempt; and selecting one of the boot devices based on the list of boot devices and the boot device previously used.

29. The method of claim 28, further comprising removing one of the boot devices from said list of available boot devices if it is determined that said one of the boot devices contains a corrupted boot image.

* * * * *